United States Patent
Ellis et al.

(10) Patent No.: US 11,078,394 B2
(45) Date of Patent: Aug. 3, 2021

(54) CATIONIC COATINGS FOR IMPROVED NANOPARTICLE TRANSPORT IN A CARBONATE RESERVOIR

(71) Applicant: Saudi Arabian Oil Company, Dhahran (SA)

(72) Inventors: Erika Shoemaker Ellis, Dhahran (SA); Howard K. Schmidt, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 14 days.

(21) Appl. No.: 16/291,601

(22) Filed: Mar. 4, 2019

(65) Prior Publication Data
US 2020/0283672 A1 Sep. 10, 2020

(51) Int. Cl.
*C09K 8/08* (2006.01)
*C09K 8/05* (2006.01)
*C09K 8/12* (2006.01)

(52) U.S. Cl.
CPC .............. *C09K 8/08* (2013.01); *C09K 8/05* (2013.01); *C09K 8/12* (2013.01); *C09K 2208/10* (2013.01)

(58) Field of Classification Search
None
See application file for complete search history.

(56) References Cited

U.S. PATENT DOCUMENTS

| 7,963,720 B2 | 6/2011 | Hoag et al. |
| 2006/0105052 A1 | 5/2006 | Acar et al. |
| 2007/0155021 A1 | 7/2007 | Zhang et al. |
| 2009/0156460 A1 | 6/2009 | Jiang et al. |
| 2009/0202816 A1 | 8/2009 | Schlenoff |
| 2010/0166665 A1 | 7/2010 | Butts et al. |
| 2010/0232883 A1 | 9/2010 | Hoag et al. |
| 2017/0015896 A1* | 1/2017 | Cox ............... C09K 8/588 |
| 2017/0210973 A1* | 7/2017 | Agrawal ........ C09K 8/032 |
| 2018/0346797 A1* | 12/2018 | Kalgaonkar ...... C09K 8/5755 |

(Continued)

FOREIGN PATENT DOCUMENTS

| WO | 2018104544 A1 | 6/2018 |
| WO | 2018/222648 A1 | 12/2018 |

OTHER PUBLICATIONS

Abidin, "Polymers for Enhanced Oil Recovery Technology", Article, 2012, 6 pgs, Procedia Chemistry 4 (2012) 11-16, SciVerse ScienceDirect.

(Continued)

*Primary Examiner* — Jeffrey D Washville
(74) *Attorney, Agent, or Firm* — Dinsmore & Shohl

(57) ABSTRACT

Coated nanoparticles include nanoparticles with a cationic coating, such that the nanoparticles have a net-positive charge. The cationic coatings may be selected from an amino acid, a polysaccharide, a polyamine, an acrylate polymer, a dendrimer, a copolymer, a histone, a protein, an ester, or combinations thereof. The coated nanoparticles may be incorporated into methods for improving an amount of oil recovered during enhanced oil recovery. The methods may include introducing an aqueous drilling fluid comprising coated nanoparticles to a carbonate reservoir and injecting drilling fluid comprising the coated nanoparticles into the carbonate reservoir to displace oil in the carbonate reservoir and thereby enhance the oil recovery.

26 Claims, 2 Drawing Sheets

(56) References Cited

U.S. PATENT DOCUMENTS

2018/0362834 A1* 12/2018 Haghighi .............. C09K 8/88

OTHER PUBLICATIONS

Alsofi, "Assessment of Polymer Interactions with Carbonate Rocks and Implications for EOR applications", Article, 2017, 9 pgs, Society of Petroleum Engineers.

Biehl, "Synthesis, Characterization, and Applications of Magnetic Nanoparticles Featuring Polyzwitterionic Coatings", Article, 2018, 19 pgs, Polymers 2018, 10, 91.

Bilensoy, "Cationic nanoparticles for cancer therapy", Article, 2010, 16 pgs, ResearchGate.

Choi, "Nanofluid Enhanced Oil Recovery Using Hydrophobically Associative Zwitterionic Polymer-Coated Silica Nanoparticles", Article, 2017, 3 pgs, Energy Fuels, 2017, 31 (8), pp. 7777-7782.

Han, "Laboratory Study on Polymers for Chemical Flooding in Carbonate Reservoirs", Article, 2014, 16 pgs, SPE International.

Kunschke, "Impact of cationic polymer coatings on PLGA nanoparticle characteristics and immunogenicity", Article.

Rutnakornpituk, "Recyclable magnetite nanoparticle coated with cationic polymers for adsorption of DNA", Article, 2016, 12 pgs, Journal of Biomaterials Science, Polymer Edition, 2016, vol. 27, No. 11, 1200-1210.

Sodeifian, "Study of adsoptive behavior of sulfonated polyacrylamide onto carbonate rock particles to enhance oil recovery", Article, 2015, 8 pgs, Korean J. Chem. Eng., 32(12), 2484-2491 (2015).

Song, "Water-soluble polyacrylamide coated-Fe3O4 magnetic composites for high-efficient enrichment of U(VI) from radioactive wastewater", Article, 2014, 9 pgs, Chemical Engineering Journal 246 (2014) 268-276.

Sun, "Novel core-shell structure polyacrylamide-coated magnetic nanoparticles synthesized via photochemical polymerization", Article, 2005, 5 pgs, Surface & Coatings Technology 201 (2006) 250-254.

Thanetnit, "Synthesis of Cationic Polymer Coated Magnetite Nanoparticles Based on Poly(maleic anhydride-alt-1-octadecene)", Article, 2017, 10 pgs, Chiang Mai J. Sci. 2017; 44(4) : 1487-1496.

Yousefvand, "Enhanced Oil Recovery Using Polymer/nanosilica", Article, 2015, 6 pgs, Procedia Materials Science 11 (2015) 565-570.

Yu, "Transport and Retention of Aqueous Dispersions of Paramagnetic Nanoparticles in Reservoir Rocks", Article, 2010, 21 pgs, SPE International.

Yu, "Transport and Retention of Surface-Modified Nanoparticles in Sedimentary Rocks", Dissertation, 2012, 290 pgs.

Zhang, "Control synthesis of magnetic Fe3O4-chitosan nanoparticles under UV irradiation in aqueous system", Article, 2010, 6 pgs, Current Applied Physics 10 (2010) 828-833.

Augustine, et al., "Mechanical governing nanoparticle flow behavior in porous media: insight for enhanced oil recovery applications", International Nano Letters, BioMed Central Ltd., London, England, vol. 8, No. 2, Jun. 4, 2018, pp. 49-77.

International Search Report and Written Opinion pertaining to PCT International Application No. PCT/US2019/034344, dated Oct. 16, 2019, pp. 14.

* cited by examiner

CATIONIC COATINGS FOR IMPROVED NANOPARTICLE TRANSPORT IN A CARBONATE RESERVOIR

TECHNICAL FIELD

The present specification generally relates to methods for improving an amount of oil recovered during enhanced oil recovery.

BACKGROUND

While carbonate reservoirs may exhibit highly varying properties, all carbonate reservoir surfaces are positively charged due to an excess of cationic species, such as calcium ($Ca^{2+}$) ions. Recently, coated nanoparticles have become commonly used during enhanced oil recovery (EOR) to increase oil production by breaking surface tension or by acting as oil tracers. However, typical nanoparticles present a range of problems such as agglomeration or precipitation in the carbonate reservoir. As such, in order to achieve functionality, the nanoparticles must stay dispersed in the fluid without agglomeration or precipitation in the typical environment of the carbonate reservoir. Moreover, the nanoparticles must be able to propagate long distances within the carbonate reservoir with only minimal retention as the nanoparticle travels through the carbonate reservoir.

Typical nanoparticles without coatings may be unstable and tend to agglomerate or precipitate even at ambient conditions. Nanoparticles coated with anionic coatings, while stable, may be unable to propagate long distances in the carbonate reservoir as their net negative charge attracts the nanoparticles to the net-positive cationic surfaces in the carbonate reservoir.

SUMMARY

Accordingly, there are ongoing needs for cationically-coated nanoparticles having a net-positive charge. Such nanoparticles coatings should exhibit reduced retention of the coated nanoparticles in the carbonate reservoir. Such cationic coatings, as described in this disclosure, are able to improve an amount of oil recovered during EOR.

The present specification is directed to methods for improving an amount of oil recovered during enhanced oil recovery. According to embodiments, the method may include introducing an aqueous drilling fluid comprising coated nanoparticles to a carbonate reservoir. The carbonate reservoir having a net-positive charge, in which the coated nanoparticles are coated with a cationic coating having a net-positive charge. The method may further include injecting drilling fluid comprising the coated nanoparticles into the carbonate reservoir to displace oil in the carbonate reservoir and thereby enhance the oil recovery. The coated nanoparticles are retained within the drilling fluid with reduced agglomeration in the carbonate reservoir due to electrostatic repulsion. The electrostatic repulsion may be produced by the interaction of the positive charge of the coated nanoparticles and the positive charge of the carbonate reservoir.

Without being bound by theory, the coated nanoparticles may break surface tension and act as oil tracers in the carbonate reservoir. Therefore, these coatings impart the nanoparticles with suitable stability in the carbonate reservoir while also achieving desirable propagation, thereby increasing viscosity and improving the amount of oil recovered from the carbonate reservoir during EOR.

Additional features and advantages of the embodiments described in this disclosure will be set forth in the detailed description which follows. Additional features and advantages will also be readily apparent to those skilled in the art from that description or recognized by practicing the embodiments described in this disclosure.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described in this disclosure and together with the description serve to explain the principles and operations of the claimed subject matter.

DETAILED DESCRIPTION

Figure 1:
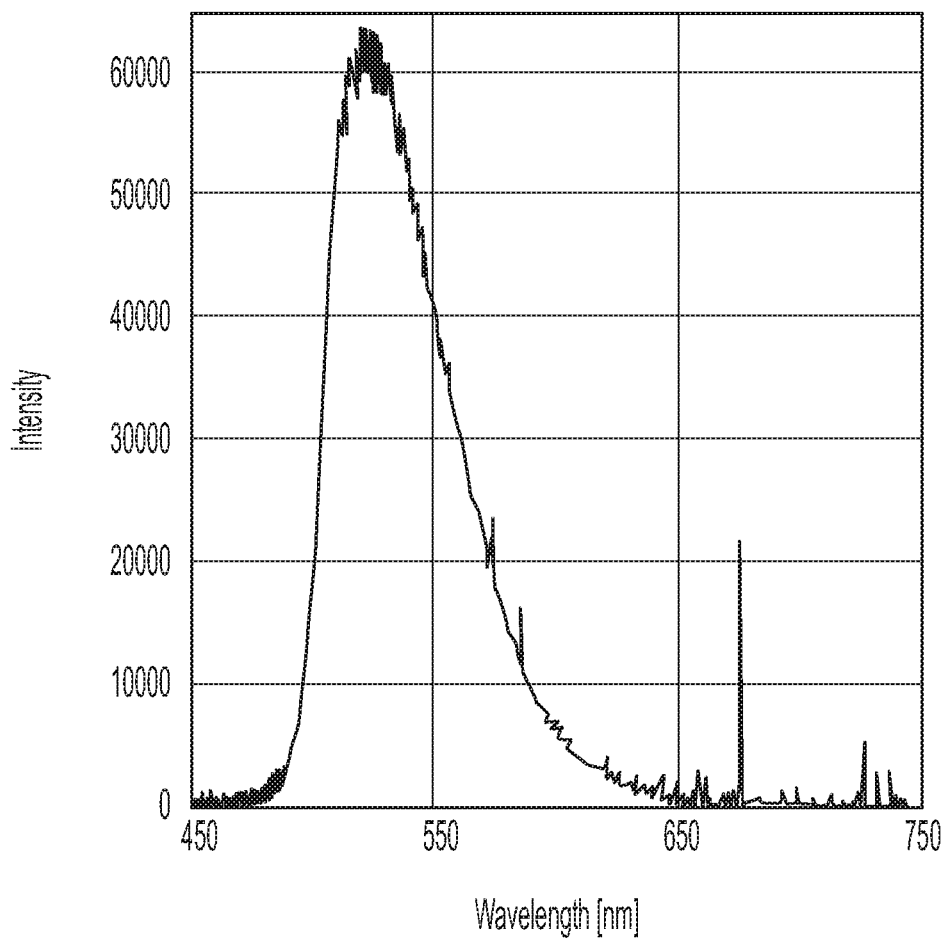
FIG. 1 is a graph of fluorescent excitement of dextran-coated nanoparticles before being tested for retention in a carbonate column.

According to embodiments of this disclosure, methods are disclosed for enhancing oil recovery with an aqueous drilling fluid comprising coated nanoparticles having a net-positive charge that are believed to have suitable stability in the carbonate reservoir while also achieving desirable propagation when compared to conventional nanoparticles.

A coated nanoparticle according to embodiments includes a cationic coating in which the coated nanoparticles are coated and have a net positive charge. In some embodiments, the coated nanoparticles are incorporated into an aqueous drilling fluid, used in methods for improving an amount of oil recovered during enhanced oil recovery.

The cationic coating according to embodiments has a net-positive charge. In embodiments, the cationic coating may include any polymers that have a cationic charge. For example, the cationic coating may be selected from an amino acid, a polysaccharide, a polyamine, an acrylate polymer, a dendrimer, a copolymer, a histone, a protein, an ester, or combinations thereof.

Referring to the cationic coating, in some embodiments, the cationic coating may include an amino acid. Suitable amino acids may include positively-charged amino acids, such as poly-1-lysine, poly-1-arginine, or poly-1-histidine, or combinations thereof. In certain embodiments, the amino acid comprises poly-1-lysine.

In further embodiments, the cationic coating may include a polysaccharide. Suitable polysaccharides may include any positively-charged polysaccharides, such as chitosan, cyclodextrin, α-cyclodextrin, or combinations thereof. In certain embodiments, the polysaccharide comprises chitosan.

In other embodiments, the cationic coating may include a polyamine. Suitable polyamines may include any positively-charged polyamines having the formula ($C_2H_5N$). The subscript n denotes the number of repeating units. In some embodiments, subscript n is an integer ranging from 2 to 40, from 5 to 35, from 6 to 31, from 7 to 30, from 8 to 29, from 9 to 28, from 10 to 27, from 11 to 26, from 12 to 25, from 13 to 24, from 14 to 23, from 15 to 22, from 16 to 21, from 17 to 20, from 18 to 19, or any range between 2 and 40. One non-limiting specific example of polyamine includes polyethyleneimine. The polyethyleneimine may be linear, branched, or a polyethyleneimine-containing dendrimer.

In further embodiments, the cationic coating may include an acrylate polymer. Suitable acrylate polymers may include positively-charged acrylate polymers, such as poly(methyl acrylate), poly(ethyl acrylate), polymethacrylate, polyacrylamine, poly(dimethylaminoathyl methacrylate), or combinations thereof. In certain embodiments, the acrylate polymer comprises polymethacrylate.

In yet other embodiments, the cationic coating may include a dendrimer. Suitable dendrimers may include positively-charged dendrimers, such as poly(amidoamine), poly (propylene imine), poly(etherhydroxylamine), or combinations thereof. In certain embodiments, the dendrimer comprises poly(amidoamine).

In further embodiments, the cationic coating may include a copolymer. Suitable copolymers may include positively-charged copolymers, such as poly(lactic-co-glycolic acid). The weight ratio of lactide to glycolide used for the polymerization of poly(lactic-co-glycolic acid) may be from 1:99 to 99:1, based on the total weight of the poly(lactic-co-glycolic acid). Additional suitable weight ratios of lactide to glycolide present in the poly(lactic-co-glycolic acid) are from 5:95 to 95:5, from 10:90 to 90:10, from 20:80 to 80:20, from 25:75 to 75:25, from 30:70 to 70:30, from 40:60 to 60:40, 50:50, or from any other suitable weight ratio between 1:99 and 99:1, based on the total weight of the poly(lactic-co-glycolic acid).

Referring still to the cationic coating, in additional embodiments, the cationic coating may include a histone. Suitable histones may include positively-charged histones, such as H2A, H2B, H3, H4, H1, combinations thereof, or any subfamily or members thereof. Non-limiting specific examples of histones include histones from subfamilies H1F, H1H1, H2AF, H2A1, H2A2, H2BF, H2B1, H2B2, H3A1, H3A2, H3A3, H41, H44, or combinations thereof.

In other embodiments, the cationic coating may include a protein. Suitable proteins may include positively-charged proteins, such as collagen. The collagen may be a fibrillar collagen, such as Type I, Type II, Type III, Type V, Type XI, or combinations of thereof. In embodiments, the collagen may instead be a non-fibrillar collagen, such as Type IV, Type VI, Type VII, Type VIII, Type IX, Type X, Type XII, Type XIII, Type XIV, Type XV, Type XVI, Type XVII, XVIII, XIX, XX, XXI, or combinations thereof.

In further embodiments, the cationic coating may include an ester. For example, the cationic coating may include any ester that has been converted into a cationic polymer through chemical synthesis. Suitable esters may include, but are not limited to, positively-charged esters, such as poly(b-amino ester), polycarboxybetaine, ortho esters, glycidic esters, cellulose, dextran esters, or combinations thereof.

Referring now to the nanoparticles, in embodiments, the nanoparticles may include any positively-charged nanoparticle. Suitable nanoparticles may include, but are not limited to, metal oxides, silica, polymers, or combinations thereof. Suitable metal oxides may include aluminum oxide, iron oxide, nickel oxide, titanium oxide, zinc oxide, zirconium oxide, or combinations thereof.

In embodiments, the nanoparticles have any suitable diameter, such as between 1 nanometer (nm) and 100 nm. Other suitable diameters of the nanoparticles range from 10 nm to 100 nm, from 20 nm to 100 nm, from 30 nm to 90 nm, from 40 nm to 80 nm, from 50 nm to 70 nm, from 60 nm to 65 nm, or any other suitable diameter between 1 nm and 100 nm.

The various embodiments of coated nanoparticles previously described may be incorporated in methods that include one or more coated nanoparticles according to any of the embodiments previously described.

According to embodiments, the method may include introducing an aqueous drilling fluid comprising coated nanoparticles to a carbonate reservoir. The carbonate reservoir having a net-positive charge, in which the coated nanoparticles are coated with a cationic coating having a net-positive charge. The method may further include injecting drilling fluid comprising the coated nanoparticles into the carbonate reservoir to displace oil in the carbonate reservoir and thereby enhance the oil recovery. The coated nanoparticles are retained within the drilling fluid with reduced agglomeration in the carbonate reservoir due to electrostatic repulsion. The electrostatic repulsion may be produced by the interaction of the positive charge of the coated nanoparticles and the positive charge of the carbonate reservoir In some embodiments, the aqueous solution may include either fresh water or saline, such as seawater. In certain embodiments, the aqueous solution may be a drilling fluid. The hardness of the aqueous solution may vary depending on whether fresh water or saline is utilized.

In embodiments that utilize fresh water as the aqueous solution, the hardness of the aqueous solution may range from 15 milligrams per liter (mg/L) to 400 mg/L. Other suitable hardness ranges of the aqueous solution when fresh water is utilized may include a hardness ranging from 25 mg/L to 375 mg/L, from 50 mg/L to 350 mg/L, from 75 mg/L to 325 mg/L, from 100 mg/L to 300 mg/L, from 125 mg/L to 275 mg/L, from 150 mg/L to 250 mg/L, from 175 mg/L to 225 mg/L, or from any other suitable range between 15 mg/L and 400 mg/L.

In embodiments that utilize saline as the aqueous solution, the hardness of the saline may range from 2,000 mg/L to 10,000 mg/L. Other suitable hardness ranges of the aqueous solution when saline is utilized may include a hardness ranging from 2,500 mg/L to 9,500 mg/L, from 3,000 mg/L to 9,000 mg/L, from 3,500 mg/L to 8,500 mg/L, from 4,000 mg/L to 8,000 mg/L, from 4,500 mg/L to 7,500 mg/L, from 5,000 mg/L to 7,000 mg/L, from 5,500 mg/L to 7,000 mg/L, from 6,000 mg/L to 7,000 mg/L, or from any other suitable range between 2,000 mg/L and 10,000 mg/L.

In further embodiments that utilize saline as the aqueous solution, the salinity of the saline may range from 1,000 mg/L to 200,000 mg/L. Other suitable salinity ranges of the aqueous solution when saline is utilized may include a salinity ranging from 5,000 mg/L to 175,000 mg/L, from 10,000 mg/L to 150,000 mg/L, from 15,000 mg/L to 125,000 mg/L, from 20,000 mg/L to 100,000 mg/L, from 25,000 mg/L to 75,000 mg/L, from 25,000 mg/L to 50,000 mg/L, from 30,000 mg/L to 40,000 mg/L, from 32,500 mg/L to 37,500 mg/L, or from any other suitable range between 1,000 mg/L and 200,000 mg/L.

According to one or more embodiments, the saline may include a concentration of salt dissolved in water. In some embodiments, the aqueous solution may include one or more alkali or alkaline earth metal halides. Non-limiting specific examples of the salt include alkali or alkaline earth metal halides such as calcium chloride, calcium bromide, sodium chloride, sodium bromide, magnesium chloride, magnesium bromide, or combinations thereof.

Regardless of which aqueous solution is chosen, the temperature of the aqueous solution injected into the carbonate reservoir may range from 25 degrees Celsius (° C.) to 100° C. Other suitable temperature ranges of the aqueous solution injected into the carbonate reservoir include temperatures from 30° C. to 95° C., from 35° C. to 90° C., from 40° C. to 85° C., from 45° C. to 80° C., from 50° C. to 75° C., from 55° C. to 70° C., or from any other suitable range between 25° C. and 100° C.

In other embodiments, the aqueous solution may further include a naturally-occurring fluid, such as crude oil. Suitable examples of the naturally-occurring fluid include crude oil having an American Petroleum Institute (API) gravity ranging from 10° to 70°. Additional suitable API gravity ranges of the naturally-occurring fluid are from 20° to 60°, from 20° to 50°, from 20° to 40°, from 25° to 40°, from 25° to 35°, from 27° to 34°, from 30° to 33°, or from 31° to 33°. In certain embodiments, the API gravity of the fluid is 31°. Non-limiting specific examples of the naturally-occurring fluid include Arab Heavy, Saudi Arabia Heavy, Arab Medium, Saudi Arabia Medium, Arab Light, Saudi Arabia Light, Arab Extra Light, Arab Super Light, or combinations thereof.

EXAMPLES

The following comparative examples illustrate one or more additional features of the present disclosure described previously.

In the following examples, dextran-coated nanoparticles were prepared and tested for their suitability of reducing the retention of the dextran-coated nanoparticles in a carbonate reservoir by electrostatic repulsion. It should be noted that dextran is an anionic coating, rather than a cationic coating. However, this process is suitable for producing nanoparticles coated with other coatings, such as those in previously described embodiments.

Generally, the dextran-coated nanoparticles were prepared by dissolving 1.35 grams (g) (or, 0.005 moles) of iron(III) chloride hexahydrate ($FeCl_3 \cdot 6\ H_2O$) in 50 milliliters (mL) of deionized water in a round bottom flask. Then, 3.0 g of 90 kilodalton (kDa) molecular weight dextran was added to the solution. The round bottom flask was then cooled to 5° C. by submersing it in an ice bath. The round bottom flask was then deoxygenated with a nitrogen ($N_2$) purge with vigorous stirring for 30 minutes.

Next, 0.54 g (0.0027 moles) of iron (II) chloride tetrahydrate ($FeCl_2.4H_2O$) was dissolved in 5 mL of deionized water. This solution was then added to the round bottom flask and the mixture was stirred under an $N_2$ atmosphere for 10 minutes. Then, 3 mL of 30% ammonium hydroxide ($NH_4OH$) solution was added to the solution dropwise over a 15 minute period. A color change in the solution, from orange to dark brown, was observed during this period. The reaction was then heated to 80° C. for 45 minutes and subsequently cooled to room temperature in order to produce a nanoparticle solution.

At this stage, the dextran was non-covalently attached to the surface of the nanoparticles. Crosslinking was then utilized to improve dextran attachment to the nanoparticles. To achieve this crosslinking, 2 mL of pentaerythritol glycidyl ether was added to 200 mL aqueous solution of 1 molar (M) sodium hydroxide (NaOH) and 400 milligrams (mg) of sodium borohydride ($NaBH_4$) in a second round bottom flask to produce a crosslinking formulation. The nanoparticle solution was transferred to a funnel that was mounted to the second round bottom flask containing the crosslinking formulation. The nanoparticle solution was added dropwise over 1 hour under vigorous stirring of the crosslinking formulation. The reaction proceeded for 24 hours and then 20 mL of 2 M 2-amino-2-hydroxymethyl-propane-1,3-diol was added to quench the reaction. The reaction then proceeded for 12 hours.

Finally, the solution was purified using tangential flow filtration. After the minute-long cooling/deoxygenation cycle, 2.7 g $FeCl_2.4H_2O$ was dissolved in 5 mL deionized water and added to the round bottom flask. Then, 15 mL concentrated aqueous ammonia ($NH_3$) was added dropwise to the solution with a syringe. After addition of the concentrated aqueous $NH_3$, the reaction was heated to 80° C. for 1 hour in order to produce the dextran coating. The nanoparticles were then coated with the dextran coating to produce the fluorescently labelled dextran nanoparticles.

Retention tests were conducted using dextran to test the suitability of the dextran-coated nanoparticles in a cationically-rich environment such as those typically found in carbonate reservoirs. Generally, the retention tests were conducted by packing a column, such as the KONTES® FLEX-COLUMN®, with crushed carbonate at 30% porosity. Once the column was packed, fluorescently labelled dextran nanoparticles dissolved in seawater having a dissolved solid concentration of 60,000 mg/L was pumped through the bottom of the column through capillary tubing with a syringe pump at a specified flow rate. In these tests, the fluorescently labelled dextran was added to the solution at 10 mg/L by weight, based on the total weight of the solution.

Figure 2:
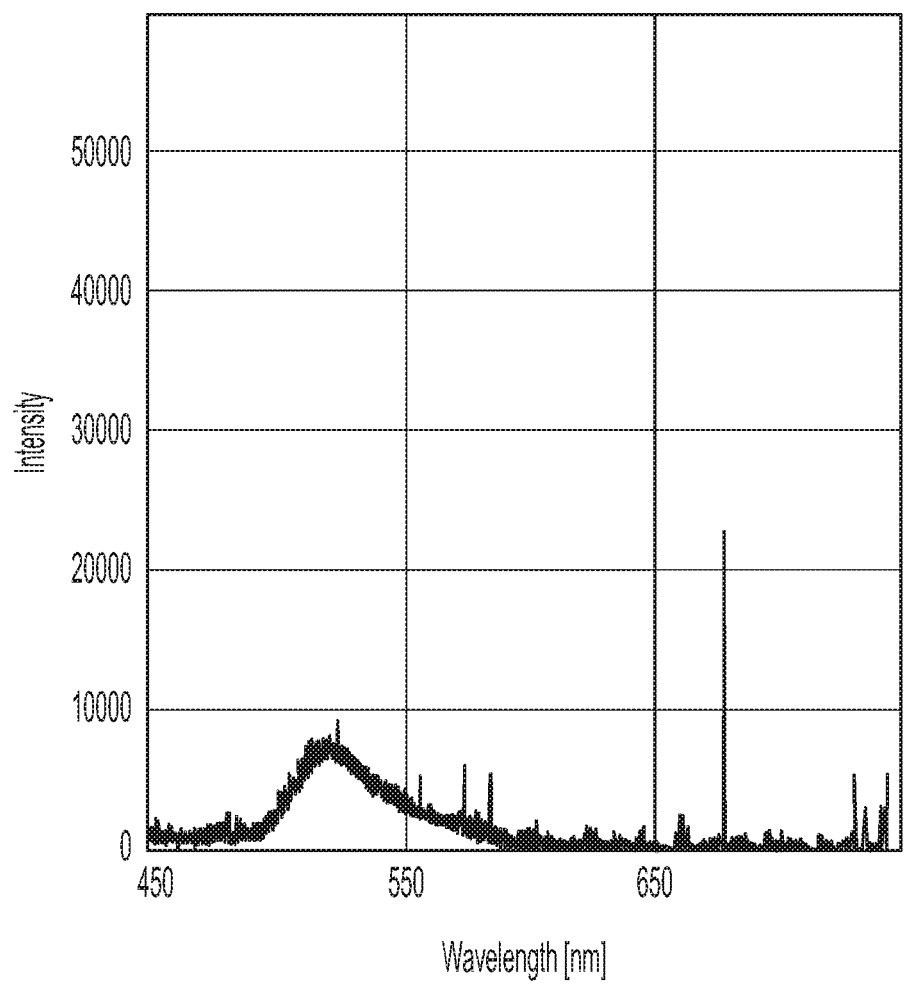
FIG. 2 is a graph of fluorescent excitement of effluent from the carbonate column after the dextran-coated nanoparticles have been pushed through the column.

Once the solution reached the top of the column, the column was read by a spectrometer. An excitation wavelength of 405 nm was used to excite the fluorescently labelled dextran and emit ultraviolet (UV) radiation, which was measured by the spectrometer. The intensity of the emission of the fluorescent dextran radiating from the column is related to the amount of dextran that has been retained in the column. As such, the greater the fluorescence, the less dextran is retained. In contrast, the lower the fluorescence, the more dextran is retained. These results may be extrapolated and applied to a carbonate reservoir. In other words, relatively reduced fluorescence indicates that the dextran is retained due to adsorption. Here, as can be seen in FIGS. 1 and 2, the dextran-coated nanoparticles showed a large reduction in fluorescent intensity, indicating that the nanoparticles were mostly retained in the column. Such levels retention is undesirable as it reduces the efficacy of the nanoparticles introduced to the carbonate reservoir.

In contrast, cationically-coated nanoparticles would show increased fluorescence if subjected to the same tests. As previously stated, increased relative fluorescence indicates a reduced retention of the nanoparticles, which, in turn, would show improved transport characteristics of the nanoparticles in the carbonate reservoir. Therefore, cationically-coated nanoparticles would be heavily preferred over the anionic coated nanoparticles used in the art, as the cationically-coated nanoparticles provide improved transport properties in the carbonate reservoir, thereby increasing potential oil recovery.

According to a first aspect of the present disclosure, a method for improving an amount of oil recovered during enhanced oil recovery includes introducing the coated nanoparticles to a carbonate reservoir, the carbonate reservoir having a net-positive charge, in which the coated nanoparticles are coated with a cationic coating having a net-positive charge; and reducing the retention of the coated nanoparticles in the carbonate reservoir by electrostatic repulsion, the electrostatic repulsion being produced by the interaction of the positive charge of the coated nanoparticles and the positive charge of the carbonate reservoir.

A second aspect of the present disclosure may include the first aspect, in which the cationic coating is selected from an amino acid, a polysaccharide, a polyamine, an acrylate polymer, a dendrimer, a copolymer, a histone, a protein, an ester, or combinations thereof.

A third aspect of the present disclosure may include the first aspect or the second aspect, in which the cationic coating comprises an amino acid.

A fourth aspect of the present disclosure may include any of the first through third aspects, in which the amino acid is selected from poly-1-lysine, poly-1-arginine, poly-1-histidine, or combinations thereof.

A fifth aspect of the present disclosure may include any of the first through fourth aspects, in which the cationic coating comprises a polysaccharide.

A sixth aspect of the present disclosure may include any of the first through fifth aspects, in which the polysaccharide is selected from chitosan, cyclodextrin, α-cyclodextrin, or combinations thereof.

A seventh aspect of the present disclosure may include any of the first through sixth aspects, in which the cationic coating comprises a polyamine.

An eighth aspect of the present disclosure may include any of the first through seventh aspects, in which the polyamine comprises polyethyleneimine.

A ninth aspect of the present disclosure may include any of the first through eighth aspects, in which the cationic coating comprises an acrylate polymer.

A tenth aspect of the present disclosure may include any of the first through ninth aspects, in which the acrylate polymer is selected from poly(methyl acrylate), poly(ethyl acrylate), polymethacrylate, polyacrylamine, poly(dimethylaminoathyl methacrylate), or combinations thereof.

An eleventh aspect of the present disclosure may include any of the first through tenth aspects, in which the cationic coating comprises a dendrimer.

A twelfth aspect of the present disclosure may include any of the first through eleventh aspects, in which the dendrimer is selected from poly(amidoamine), poly(propylene imine), poly(etherhydroxylamine), or combinations thereof.

A thirteenth aspect of the present disclosure may include any of the first through twelfth aspects, in which the cationic coating comprises a copolymer.

A fourteenth aspect of the present disclosure may include any of the first through thirteenth aspects, in which the copolymer comprises poly(lactic-co-glycolic acid).

A fifteenth aspect of the present disclosure may include any of the first through fourteenth aspects, in which the cationic coating comprises a histone.

A sixteenth aspect of the present disclosure may include any of the first through fifteenth aspects, in which the histone is selected from H2A, H2B, H3, H4, H1, or combinations thereof.

A seventeenth aspect of the present disclosure may include any of the first through sixteenth aspects, in which the cationic coating comprises a protein.

An eighteenth aspect of the present disclosure may include any of the first through seventeenth aspects, in which the protein comprises a collagen.

A nineteenth aspect of the present disclosure may include any of the first through eighteenth aspects, in which the cationic coating comprises an ester.

A twentieth aspect of the present disclosure may include any of the first through nineteenth aspects, in which the ester comprises poly(b-amino ester).

A twenty-first aspect of the present disclosure may include any of the first through twentieth aspects, in which the nanoparticles comprise metal oxide, silica, polymers, or combinations thereof.

A twenty-second aspect of the present disclosure may include any of the first through twenty-first aspects, in which the metal oxide is selected from aluminum oxide, iron oxide, nickel oxide, titanium oxide, zinc oxide, zirconium oxide, or combinations thereof.

A twenty-third aspect of the present disclosure may include any of the first through twenty-second aspects, in which the nanoparticles have a diameter ranging from 1 nm to 100 nm.

A twenty-fourth aspect of the present disclosure may include any of the first through twenty-third aspects, in which the aqueous solution comprises fresh water, saline, or combinations thereof.

It should be apparent to those skilled in the art that various modifications and variations can be made to the embodiments described in this disclosure without departing from the spirit and scope of the claimed subject matter. Thus it is intended that the specification covers the modifications and variations of the various embodiments described in this disclosure provided such modification and variations come within the scope of the appended claims and their equivalents.

What is claimed is:

1. A method for enhancing oil recovery comprising:
   introducing a drilling fluid comprising an aqueous base fluid and a group of coated nanoparticles to a carbonate reservoir, the carbonate reservoir having a net-positive charge, in which:
   the group of coated nanoparticles consist of nanoparticles and a cationic coating,
   each of the nanoparticles is coated with the cationic coating,
   the cationic coating has a net-positive charge, and
   in which each coated nanoparticle has a net-positive charge; and
   injecting the drilling fluid comprising the coated nanoparticles into the carbonate reservoir to displace oil in the carbonate reservoir and thereby enhance the oil recovery, the coated nanoparticles being retained within the drilling fluid with reduced agglomeration in the carbonate reservoir due to electrostatic repulsion, the electrostatic repulsion being produced by the interaction of the positive charge of the coated nanoparticles and the positive charge of the carbonate reservoir.

2. The method of claim 1, in which the cationic coating is selected from an amino acid, a polysaccharide, a polyamine, an acrylate polymer, a dendrimer, a copolymer, a histone, a protein, an ester, or combinations thereof.

3. The method of claim 1, in which the cationic coating comprises an amino acid.

4. The method of claim 3, in which the amino acid is selected from poly-1-lysine, poly-1-arginine, poly-1-histidine, or combinations thereof.

5. The method of claim 1, in which the cationic coating comprises polysaccharide.

6. The method of claim 5, in which the polysaccharide is selected from chitosan, cyclodextrin, α-cyclodextrin, or combinations thereof.

7. The method of claim 1, in which the cationic coating comprises polyamine.

8. The method of claim 7, in which the polyamine comprises polyethyleneimine.

9. The method of claim 1, in which the cationic coating comprises an acrylate polymer.

10. The method of claim 9, in which the acrylate polymer is selected from poly(methyl acrylate), poly(ethyl acrylate), polymethacrylate, polyacrylamine, poly(dimethylaminoathyl methacrylate), or combinations thereof.

11. The method of claim 1, in which the cationic coating comprises a dendrimer.

12. The method of claim 11, in which the dendrimer is selected from poly(amidoamine), poly(propylene imine), poly(etherhydroxylamine), or combinations thereof.

13. The method of claim 1, in which the cationic coating comprises a copolymer.

14. The method of claim 13, in which the copolymer comprises poly(lactic-co-glycolic acid).

15. The method of claim 1, in which the cationic coating comprises a histone.

16. The method of claim 15, in which the histone is selected from H2A, H2B, H3, H4, H1, or combinations thereof.

17. The method of claim 1, in which the cationic coating comprises a protein.

18. The method of claim 17, in which the protein comprises a collagen.

19. The method of claim 1, in which the cationic coating comprises an ester.

20. The method of claim 19, in which the ester comprises poly(b-amino ester).

21. The method of claim 1, in which the nanoparticles comprise metal oxide, silica, polymers, or combinations thereof.

22. The method of claim 21, in which the metal oxide is selected from aluminum oxide, iron oxide, nickel oxide, titanium oxide, zinc oxide, zirconium oxide, or combinations thereof.

23. The method of claim 1, in which the nanoparticles have a diameter ranging from 1 nm to 100 nm.

24. The method of claim 1, in which the aqueous solution comprises fresh water, saline, or combinations thereof.

25. A method for enhancing oil recovery comprising:
introducing a drilling fluid comprising an aqueous base fluid and a group of coated nanoparticles to a carbonate reservoir, the carbonate reservoir having a net-positive charge, in which the group of coated nanoparticles consist of nanoparticles and a cationic coating, in which:
each of the nanoparticles is coated with the cationic coating,
the cationic coating has a net-positive charge, and
the drilling fluid does not include coated nanoparticles having a net-negative charge; and
injecting the drilling fluid comprising the coated nanoparticles into the carbonate reservoir to displace oil in the carbonate reservoir and thereby enhance the oil recovery, the coated nanoparticles being retained within the drilling fluid with reduced agglomeration in the carbonate reservoir due to electrostatic repulsion, the electrostatic repulsion being produced by the interaction of the positive charge of the coated nanoparticles and the positive charge of the carbonate reservoir.

26. A method for enhancing oil recovery comprising:
introducing a drilling fluid consisting essentially of an aqueous base fluid and a group of coated nanoparticles to a carbonate reservoir, the carbonate reservoir having a net-positive charge, in which:
the group of coated nanoparticles consist of nanoparticles and a cationic coating,
each of the nanoparticles is coated with the cationic coating, and
the cationic coating has a net-positive charge; and
injecting the drilling fluid into the carbonate reservoir to displace oil in the carbonate reservoir and thereby enhance the oil recovery, the coated nanoparticles being retained within the drilling fluid with reduced agglomeration in the carbonate reservoir due to electrostatic repulsion, the electrostatic repulsion being produced by the interaction of the positive charge of the coated nanoparticles and the positive charge of the carbonate reservoir.

* * * * *

UNITED STATES PATENT AND TRADEMARK OFFICE
CERTIFICATE OF CORRECTION

| | |
|---|---|
| PATENT NO. | : 11,078,394 B2 |
| APPLICATION NO. | : 16/291601 |
| DATED | : August 3, 2021 |
| INVENTOR(S) | : Ellis et al. |

It is certified that error appears in the above-identified patent and that said Letters Patent is hereby corrected as shown below:

On the Title Page

Item (74), attorney, agent or firm, after "Dinsmore & Shohl", insert --LLP--.

In the Specification

In Column 2, Line(s) 62, delete "$(C_2H_5N)$" and insert --$(C_2H_5N)_n$--, therefor.

Signed and Sealed this
Eighteenth Day of October, 2022

Katherine Kelly Vidal
*Director of the United States Patent and Trademark Office*